United States Patent [19]

Kluger et al.

[11] 4,321,354
[45] Mar. 23, 1982

[54] POLYAMINE SUBSTITUTED CYCLOALIPHATIC COMPOUNDS

[75] Inventors: Edward W. Kluger, Pauline; Tien-Kuei Su; Teresa J. Thompson, both of Spartanburg, all of S.C.

[73] Assignee: Milliken Research Corporation, Spartanburg, S.C.

[21] Appl. No.: 183,405

[22] Filed: Sep. 2, 1980

Related U.S. Application Data

[60] Continuation of Ser. No. 925,009, Jul. 17, 1978, abandoned, which is a division of Ser. No. 850,460, Nov. 10, 1977, abandoned.

[51] Int. Cl.$^3$ .............................................. C08G 59/50
[52] U.S. Cl. .................................... 528/122; 528/407
[58] Field of Search ................................ 528/122, 407

[56] References Cited

U.S. PATENT DOCUMENTS 2,897,179  7/1959  Schechter et al. ................ 528/122
3,478,081  11/1969  Harrison et al. ................... 260/464

OTHER PUBLICATIONS

Saburi et al., "Stereochemical Studies of Metal Chelates, Chemical Abstracts" 77, 158116s, (1972).

Primary Examiner—Earl A. Nielsen
Attorney, Agent, or Firm—H. William Petry; Terry T. Moyer

[57] ABSTRACT

Novel polyamine cycloaliphatic compounds are provided in which the polyamine substituted cycloaliphatic compounds contain at least two alkyl substituted amino moieties represented structurally as

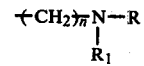

wherein n is an integer of from 0 to about 3, R and $R_1$ are

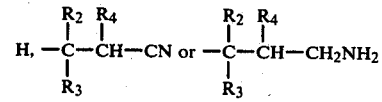

and $R_2$, $R_3$ and $R_4$ are H or alkyl moieties containing from 1 to about 10 carbon atoms. The polyamine substituted cycloaliphatic compounds are further characterized in that at least one R or $R_1$ is

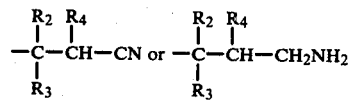

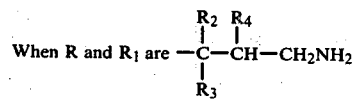

such compounds are especially useful as epoxy curing agents.

7 Claims, No Drawings

POLYAMINE SUBSTITUTED CYCLOALIPHATIC COMPOUNDS

This is a continuation of pending application Ser. No. 925,009, filed July 17, 1978, now abandoned, which is in turn a division of application Ser. No. 850,460 filed Nov. 10, 1977, now abandoned.

This invention relates to novel chemical compositions. In one aspect it relates to novel polyamine substituted cycloaliphatic compounds. In yet another aspect it relates to polyamine substituted cycloaliphatic epoxy curing agents having at least two alkyl amine moieties.

Chemical compositions, particularly novel chemical compositions, are constantly being sought by the chemical industry. Such chemical compositions are generally sought to improve properties of already existing chemical compositions, or as intermediates, to provide chemical compositions having improved physical, chemical, and/or toxicological properties. Heretofore, aromatic compositions have been employed in the production of numerous products, such as polyurethane foams, polyamides, and curing agents for resinifying polyepoxides. However, recently such aromatic structures or compounds containing same have become suspect as possessing toxicological properties which are believed hazardous to those working with or employing such compounds. Therefore, new and improved chemical compositions, including intermediate products, are constantly being sought which can be economically produced and do not possess suspect toxicological, and other undesirable properties. Further, with the wide use of polyepoxides, and the need of a curing or resinifying agent for such polyepoxides, new and improved epoxy curing agents are being sought which do not possess obnoxious odors, cause irritation to the skin of the operator, or possess other hazardous and/or toxicological properties. However, in obtaining new curing or resinifying agents for polyepoxides, the resulting products must have a sufficient hardness and strength, often at elevated temperatures, as have the prior art aromatic containing curing agents. In addition, it would be extremely desirable that the resistance of the cured products to water and solvents be substantial.

It is therefore an object of the present invention to provide novel chemical compositions which do not create toxicological problems for the processor or user of such compounds. Further, it is an object of the invention to provide new and improved curing or resinifying agents for polyepoxides which do not contain obnoxious odors, toxicological properties, and which do not sacrifice the desired hardness and strength of the cured product. These and other objects, advantages, and features of the present invention will be apparent to those skilled in the art from a reading of the following detailed description.

According to the present invention, we have now discovered novel polyamines substituted cycloaliphatic compounds which can be employed as intermediates for the production of polyurethane foams or, in certain instances, as polyepoxide curing and resinifying agents, which are economical to manufacture, do not possess undesired toxicological properties, and which, in most instances, are equivalent or superior to the prior art compositions employed in such uses. Broadly, the present invention resides in novel polyamine cycloaliphatic compounds in which the polyamine substituted cycloaliphatic compounds contain at least two alkyl substituted amino moieties represented structurally as

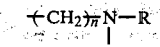

$$-(CH_2)_n-N-R$$
$$\qquad\qquad\;|$$
$$\qquad\qquad R_1$$

wherein n is an integer of from 0 to about 3, R and $R_1$ are selected from the group consisting of

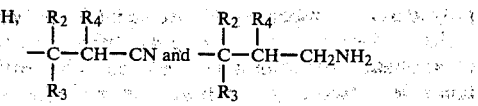

$$H, \quad -\overset{R_2}{\underset{R_3}{\overset{|}{C}}}-\overset{R_4}{\underset{|}{CH}}-CN \text{ and } -\overset{R_2}{\underset{R_3}{\overset{|}{C}}}-\overset{R_4}{\underset{|}{CH}}-CH_2NH_2$$

in which $R_2$, $R_3$, and $R_4$ are hydrogen or an alkyl moiety containing from 1 to about 10 carbon atoms. The polyamine substituted cycloaliphatic compounds described above are further characterized in that at least one of the R or $R_1$ groups is

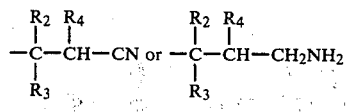

$$-\overset{R_2}{\underset{R_3}{\overset{|}{C}}}-\overset{R_4}{\underset{|}{CH}}-CN \text{ or } -\overset{R_2}{\underset{R_3}{\overset{|}{C}}}-\overset{R_4}{\underset{|}{CH}}-CH_2NH_2$$

When the polyamine cycloaliphatic compounds of the subject invention are employed as curing and resinifying agents for polyepoxides R and $R_1$ of the before described alkyl substituted amino moiety is

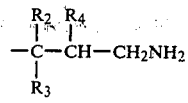

$$-\overset{R_2}{\underset{R_3}{\overset{|}{C}}}-\overset{R_4}{\underset{|}{CH}}-CH_2NH_2$$

The term "cycloaliphatic" as employed herein is to be understood to include monocycloaliphatic compounds and polycycloaliphatic compounds. Typical examples of monocycloaliphatic polycycloaliphatic nuclei which can be employed in the novel polyamine cycloaliphatic compounds of the present invention are

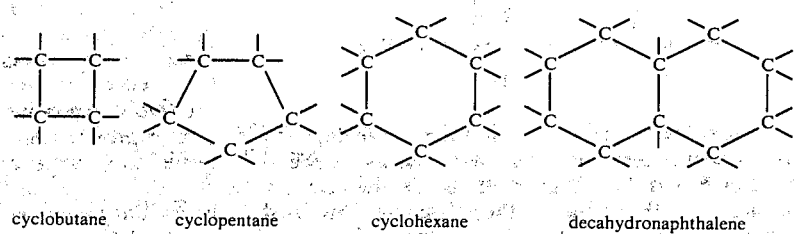

cyclobutane    cyclopentane    cyclohexane    decahydronaphthalene

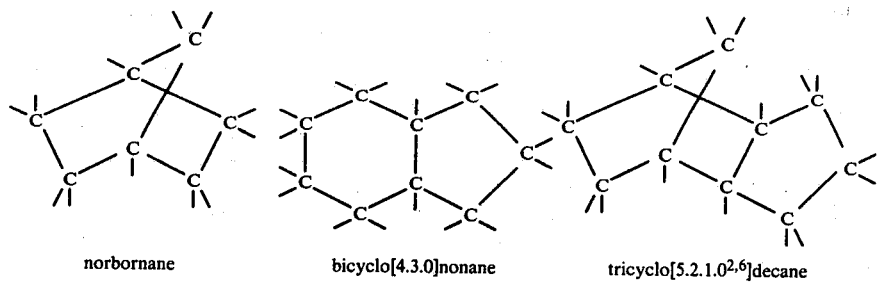

norbornane    bicyclo[4.3.0]nonane    tricyclo[5.2.1.0$^{2,6}$]decane and the like.

While any suitable monocylicaliphatic or polycyclicaliphatic or polycyclic nucleus can be employed in the polyamine cycloaliphatic compounds of the present invention, especially desirable results can be obtained when the cycloaliphatic nucleus constituent of the polyamine cycloaliphatic compounds is a monocycloaliphatic nucleus, such as cyclobutane, cyclopentane and cyclohexane. Such is especially desirable when the polyamine substituted cycloaliphatic compound is employed as a curing or resinifying agent for polyepoxides.

As previously stated, the polyamine substituted cycloaliphatic compounds of the present invention contain at least two alkyl substituted amino moieties having the general structure

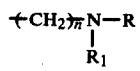

in which n is an integer of from 0 to about 3, R and $R_1$ are H,

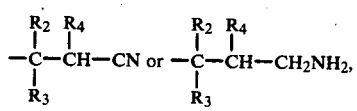

provided at least either R or $R_1$ is

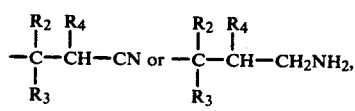

and $R_2$, $R_3$, and $R_4$ are H or an alkyl moiety containing at least 10 carbon atoms. When $R_2$, $R_3$, and $R_4$ are alkyl moieties such can be either linear or non-linear alkyl moieties. Typical of such alkyl moieties are methyl, ethyl, propyl, isopropyl, hexyl, heptyl, decyl, and the like.

R and $R_1$ of the above-described alkyl substituted amino moieties can generally be any combination of

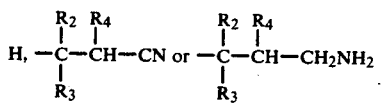

provided at least R or $R_1$ is either the above depicted cyano or amine derivative. The particular moieties employed as R and $R_1$ will generally be determined to a large degree by the end-use of the polyamine substituted cycloaliphatic compound and its method of preparation. Thus, when the polyamine substituted cycloaliphatic compounds of the present invention are employed as curing agents for resinifying polyepoxides, at least one of R and $R_1$ is

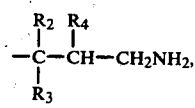

and the other H, or preferably

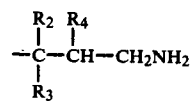

where $R_2$, $R_3$, and $R_4$ are as previously defined. Especially desirable results are obtained when $R_2$, $R_3$, and $R_4$ are hydrogen.

The polyepoxides which can be cured at elevated temperatures using the polyamine cycloaliphatic compounds as herein described are those polyepoxides possessing at least two

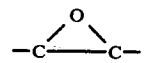

groups. These groups may be terminal, i.e.,

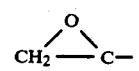

groups or they may be in an internal position. However, especially desirable results can be obtained when the epoxy groups are terminal. The polyepoxides may be saturated or unsaturated, aliphatic, cycloaliphatic, aromatic or heterocyclic, and may be substituted such as with hydroxyl groups, ether radicals and the like. Further, the polyepoxides can be monomeric or polymeric. Such polyepoxides, and their preparation, are well known in the art.

The curing of the polyepoxides with the above-described polyamine cycloaliphatic curing agents of the present invention may be accomplished by mixing the two components together. While the reaction between the two components occurs slowly at room temperature, improved results can be obtained if the mixture is heated to a temperature of from about 50° C. to about 280° C. for a period of time of from about 1 to about 24 hours and thereafter post curing the reaction product for an additional period of time of from about 1 to about 8 hours at a temperature of from about 140° C. to about 225° C. With small casting, curing of the reaction mixture can be obtained by heating the reaction mixture for about two hours at a temperature of from about 80° to 100° C. and thereafter post curing the reaction product at a temperature of from about 140° C. to 225° C. for an additional two hours or so.

The amount of the polyamine substituted cycloaliphatic compound employed as the curing agent in the cure of the polyepoxide may vary widely. However, the amount of such curing agent will generally range from about 5 parts per 100 parts of polyepoxide up to about 50 parts per 100 parts of polyepoxide. Especially desirable results are obtained when the curing agent is employed in amounts varying from about 10 to about 40 parts per 100 parts of polyepoxide.

In curing polyepoxides, it is generally desirable that the polyepoxide be in a mobile condition when the curing agent is added to insure uniform mixing. If the polyepoxide is extremely viscous or solid at room or casting temperature, the polyepoxide may be heated to reduce the viscosity or a volatile liquid solvent which can escape from the polyepoxide composition containing the polyamine cycloaliphatic curing agents by evaporation before and/or during the curing of such polyepoxide-polyamine cycloaliphatic compositions can be added to the polyepoxide to reduce its viscosity. Typical of such volatile liquid solvents are ketones, such as acetone, methyl ethyl ketone and the like, ethers, such as ethyl acetate, butyl acetate and the like, ether alcohols, such as methyl, ethyl or butyl ether of ethylene glycol and chlorinated hydrocarbons, such as chloroform.

The novel polyamine cycloaliphatic compounds of the present invention can readily be prepared by cyanoethylation of 1,2-diaminocyclohexane. Thereafter, the cyanoethylated 1,2-diaminocyclohexane can be reduced to provide the amine derivative. To illustrate the preparation of such polyamine cycloaliphatic compounds, the following series of reactions are presented.

PREPARATION OF POLYAMINE CYCLOALIPHATIC COMPOUNDS 1,2-diaminocyclohexane (1) is cyanoethylated with acrylonitrile in the presence of an acid catalyst (Equation 1) with one mole

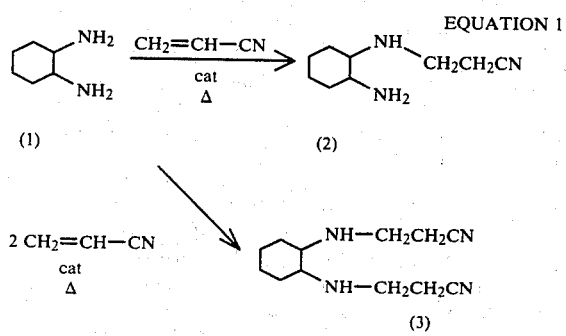

of acrylonitrile the monocyanoethylated product, N-(2-Cyanoethyl)-1,2-cyclohexanediamine, (2), is formed, two moles of acrylonitrile react to give the dicyanoethylated product, N,N'-di-(2-cyanoethyl)-1,2-diaminocyclohexane, (3).

The crude reaction mixtures can be separated by any suitable means, such as distillation under vacuum. Any suitable acid catalyst can be employed. Typical of such catalysts are acetic acid, p-toluene sulfonic acid and acetic acid salts. Generally the above reaction is carried out at a temperature of from about 20° C. to about 100° C.

The above described cyanoethylated 1,2-diaminocyclohexane can then be reduced with hydrogen in the presence of ammonia, either in the presence and absence of a solvent, such as methyl alcohol, ethyl alcohol, isopropyl alcohol, etc. N-(2-cyanoethyl)-1,2-cyclohexanediamine, (2), can be reduced to give a triamine, N-(3-aminopropyl)-1,2-cyclohexanediamine, (4), while N,N'-di-(2-cyanoethyl)-1,2-diaminocyclohexane, (3), can be reduced to give tetramine, N,N'-di-(3-aminopropyl)-1,2-diaminocyclohexane, (5).

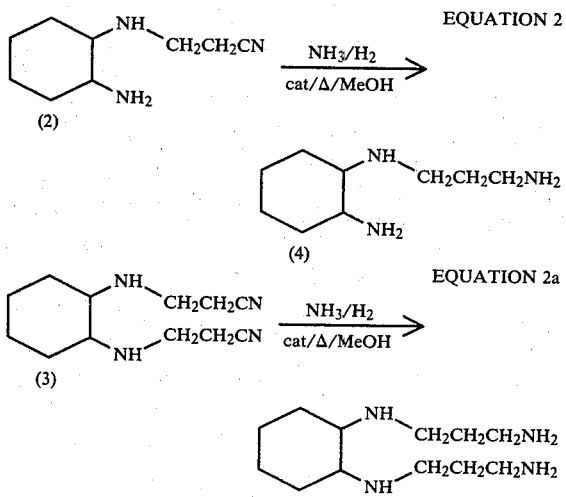

Any suitable reduction catalyst can be employed. Typical of such reduction catalysts are raney nickel, iron, palladium, platinum, ruthenium, cobalt, rhodium, osmium, iridium, including salts, and oxides thereof, and the like. Further, such catalysts can be extended on a support, such as charcoal, aluminum, kieselguhr and the like.

The crude reaction mixture can then be separated by any suitable means, such as by distillation under vacuum.

In order to more fully describe the preparation and use of the novel polyamine substituted cycloaliphatic compounds of the present invention the following Examples are given. However, such Examples are presented for illustrative purposes only and are not to be construed as unduly limiting the scope of the present invention. Unless otherwise indicated, all parts and/or percentages given in the Examples are by weight. The following are illustrations of how the cyanoethylated (Examples 1-3) are reduced (Examples 4-10) products are prepared in the laboratory. Example (11) shows that the tetramine acts as an epoxy curing agent while Examples (12-15) show how the tetramine is useful as an intermediate in the preparation of oil additives.

EXAMPLE 1

In a 250 cc three necked flask equipped with a magnetic stir bar, oil bath, reflux condenser and dropping funnel was placed 57 gm (0.5 mole) of 1,2-diaminocyclohexane. The reaction vessel was heated to 100° C. and 0.3 cc of acetic acid catalyst was added. To the diamine solution was added dropwise 66 cc (1 mole) of acrylonitrile stabilized with 0.11 gm of hydroquinone. An exothermic reaction occurs during the acrylonitrile addition. The reaction temperature was controlled during the addition of acrylonitrile so that it did not exceed 115° C. The addition of acrylonitrile was complete in about 1 hour. Afterwards, the reaction mixture was heated at 120° C. for an additional hour. The crude yield of dinitrile, N,N'-di-(2-cyanoethyl)-1,2-diaminocyclohexane, was 99.5%. The crude product was distilled under high vacuum (Bpt=198° C. at 0.5 mm Hg) to give the colorless dinitrile. Infrared, proton nuclear magnetic resonance, and gas chromotography mass spectra were consistent with the dinitrile as was the elemental analysis:

Calc. for $C_{12}H_{20}N_4$: C, 65.45%, H; 9.09%, N; 24.45%. Found: C, 64.62%; H, 9.49%; N, 25.16%.

EXAMPLE 2

In a 1000 cc three necked flask with a magnetic stir bar, oil bath, reflux condenser and dropping funnel was placed 290 gm (2.5 moles) of 1,2-diaminocyclohexane. The reaction vessel was heated to 100° C. and 2 cc of acetic acid catalyst was added. To the diamine solution was added dropwise 331 cc (5.05 moles) of acrylonitrile stabilized with 0.66 gm of hydroquinone. An exothermic reaction occurs during the acrylonitrile addition. The reaction temperature was controlled during the addition of acrylonitrile so that it did not exceed 115° C. The addition of acrylonitrile was complete in about 1 hour. Afterwards, the reaction mixture was heated at 120° C. for an additional hour. The crude yield of the dinitrile, N,N'-di-(2-cyanoethyl)-1,2-diaminocyclohexane, was 99.1%.

EXAMPLE 3

In a 1000 cc three necked flask equipped with a magnetic stir bar, oil bath, reflux condenser and dropping funnel was placed 290 gm (2.5 moles) of 1,2-diaminocyclohexane. The reaction vessel was heated to 100° C. and 1 cc of acetic acid catalyst was added. To the diamine solution was added dropwise 165 cc (2.5 moles) of acrylonitrile stabilized with 0.33 gm of hydroquinone. An exothermic reaction occurs during the acrylonitrile addition. The reaction temperature was controlled during the addition of acrylonitrile so that it did not exceed 120° C. The addition of acrylonitrile was complete in ½ hour. Afterwards, the reaction mixture was heated at 120° C. for an additional 2 hours. The crude yield of the mononitrile, N-(2-cyanoethyl)-2-aminocyclohexane, was 97%. The crude product was distilled under high vacuum (Bpt=144° C. at 0.3 mm Hg) to give the colorless mononitrile. Infrared, proton nuclear magnetic resonance and a gas chromotography mass spectra were consistent with the mononitrile as was the elemental analysis:

Calc. for $C_9H_{17}N_3$: C; 64.67%; H, 10.20%; N, 25.15%. Found: C, 63.76%; H, 10.29%; N, 24.44%.

EXAMPLE 4

In a 1000 cc rocking autoclave was placed 96.6 gm (0.44 mole) of N,N'-di-(2-cyanoethyl)-1,2-diaminocyclohexane, 250 cc of methyl alcohol, and 30 gm of raney nickel. The autoclave was sealed and 70 gm of liquid ammonia was added. The autoclave was then pressured to 2200 psi with hydrogen gas and heated to 210°-220° F. After 2 hours hydrogen absorption was complete. On cooling, the reaction mixture was filtered from the catalyst and the methyl alcohol was removed by evaporation. The crude product was then distilled at high vacuum (Bpt=156° C. at 3 mm Hg) to give 79% yield of the colorless tetramine, N,N'-di-(3-aminopropyl)-1,2-diaminocyclohexane. Infrared, proton nuclear magnetic resonance and a gas chromotography mass spectra were consistent with the tetramine as was the elemental analysis:

Calc. for $C_{12}H_{28}N_4$: C, 63.16%; H, 12.28%; N, 24.56%. Found: C, 62.73%; H, 12.35%; N, 24.74%.

EXAMPLE 5

In a 1000 cc rocking autoclave was placed 100.3 gm (0.46 mole) of N,N'-di-(2-cyanoethyl)-1,2-diaminocyclohexane, 50 cc of methyl alcohol and 30 gm of raney nickel. The autoclave was sealed and 70 gm of liquid ammonia was added. The autoclave was then pressured to 2200 psi with hydrogen gas and heated to 220°-235° F. After 1½ hours hydrogen absorption was complete. On cooling, the reaction mixture was filtered from the catalyst and the methyl alcohol was removed by evaporation. The crude product was then distilled at high vacuum (Bpt=156° C. at 3 mm Hg) to give 77% yield of the colorless tetramine, N,N'-di-(3-aminopropyl)-1,2-diaminocyclohexane.

EXAMPLE 6

In a 1000 cc rocking autoclave was placed 200 gm (0.91 mole) of N,N'-di-(2-cyanoethyl)-1,2-diaminocyclohexane, 100 cc of methyl alcohol and 40 gm of raney nickel. The autoclave was sealed and 100 gm of liquid ammonia was added. The autoclave was then pressured to 1950 psi with hydrogen gas and heated to 215° F. After 1½ hours hydrogen absorption was complete. On cooling, the reaction mixture was filtered from the catalyst and the methyl alcohol was removed by evaporation. The crude product was then distilled at high vacuum (Bpt=167° C. at 6 mm Hg) to give 74% yield of the colorless tetramine, N,N'-di-(3-aminopropyl)-1,2-diaminocyclohexane.

EXAMPLE 7

In a 1000 cc rocking autoclave was placed 141.4 gm (0.64 mole) of N,N'-di-(2-cyanoethyl)-1,2-diaminocyclohexane, and 30 gm of raney nickel. The autoclave was sealed and 35 gm of liquid ammonia was added. The autoclave was then pressured to 2000 psi with hydrogen gas and heated to 240° F. After 1½ hours hydrogen mixture was filtered from the catalyst. The crude product was then distilled at high vacuum (Bpt=164° C. at 4.2 mm Hg) to give 76% yield of the colorless tetramine, N,N'-di-(3-aminopropyl)-1,2-diaminocyclohexane.

EXAMPLE 8

In a 500 cc rocking autoclave was placed 48 gm (0.22 mole) of N,N'-di-(2-cyanoethyl)-1,2-diaminocyclohexane 100 cc of methyl alcohol and 4 gm of 62% nickel of kieselguhr. The autoclave was sealed and 30 gm of liquid ammonia was added. The autoclave was then pressured to 2200 psi with hydrogen gas and heated to 210°-235° F. After 3 hours hydrogen absorption was complete. On cooling, the reaction mixture was filtered from the catalyst and the methyl alcohol was removed by evaporation. The crude product was then distilled at high vacuum (Bpt=145° C. at 0.8 mm Hg) to give the colorless tetramine, N,N'-di-(3-aminopropyl)-1,2-diaminocyclohexane in high yield.

EXAMPLE 9

In a 1000 cc rocking autoclave was placed 100 gm (0.60 mole) of N-(2-cyanoethyl)-1,2-cyclohexanediamine, 200 cc of methyl alcohol and 30 gm of raney nickel. The autoclave was sealed and 70 gm of liquid ammonia was added. The autoclave was then pressured to 2200 psi with hydrogen gas and heated to 220°–240° F. After 2 hours hydrogen absorption was complete. On cooling, the reaction mixture was filtered from the catalyst and the methyl alcohol was removed by evaporation. The crude product was then distilled at high vacuum (Bpt=98° C. at 0.8 mm Hg) to give 44.5% yield of the colorless triamine, N-(3-aminopropyl)-1,2-cyclohexanediamine. Infrared, proton nuclear magnetic resonance and a gas chromotography mass spectra were consistent with the triamine as was the elemental analysis:

Calc. for $C_9H_{21}N_3$: C, 63.16%; H, 12.28%; N, 24.56%. Found: C, 63.63%; H, 12.28%; N, 23.87%.

EXAMPLE 10

In a 1000 cc rocking autoclave was placed 274 gm (1.64 mole) of N-(2-cyanoethyl)-1,2-cyclohexanediamine and 40 gm of raney nickel. The autoclave was sealed and 60 gm of liquid ammonia was added. The autoclave was then pressured to 2000 psi with hydrogen gas and heated to 220°–230° F. After 1½ hours hydrogen absorption was complete. On cooling, the reaction mixture was filtered from the catalyst. The crude product was then distilled at high vacuum (Bpt=124° C. at 6 mm Hg) to give 48.9% yield of the colorless triamine, N-(3-aminopropyl)-1,2-cyclohexanediamine.

EXAMPLE 11

To 100 parts of epoxy resin based on diglycidyl ether of bisphenol A,

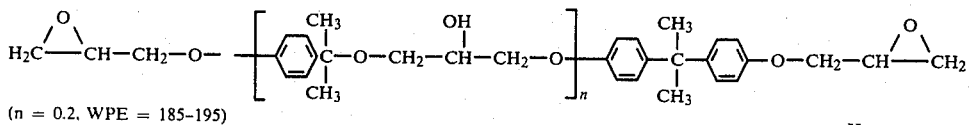

(n = 0.2, WPE = 185-195)

was added 25 parts of tetramine prepared in Example 4. The mixture is stirred by high shearing for 2 minutes followed by centrifuging at the speed of 3000 rpm for another 3 minutes. This resin mixture was cured in an aluminum mold immersed in a silicon oil bath at the temperature of 80° C. for 2 hours followed by placing in an oil bath of 150° C. for another 2 hours.

The cured samples have the dimension of ½"×½"×4" (wxtxl) between the supports for the determination of heat deflection of temperature (ASTM D648-56). The heat deflection temperature of this system is 121.5° C. under the stress of 264 psi and heating rate of 2 degree/minute.

n=repeating unit
WPE=weight per epoxide

The above examples clearly indicate the preparation of the polyamine substituted cycloaliphatic compounds of the present invention. Further, Example 11 illustrates the use of the amine derivative as an epoxy curing agent.

Having thus described the invention, we claim:

1. An epoxy resin composition comprising an epoxy resin and an epoxy resin curing agent wherein the epoxy resin curing agent is a compound having the formula:

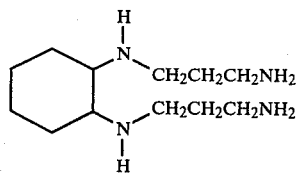

2. The epoxy resin composition of claim 1 wherein said epoxy resin is selected from polyepoxides having at least two

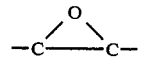

groups.

3. The epoxy resin composition of claim 2 wherein said

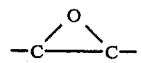

groups are terminal groups.

4. The epoxy resin composition of claim 3 wherein said epoxy resin is a diglycidyl ether of bis-phenol.

5. An epoxy resin composition comprising an epoxy resin and an epoxy resin curing agent, wherein the epoxy resin curing agent is a compound having the formula:

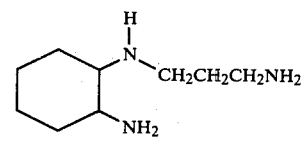

6. The epoxy resin composition of claim 5 wherein said epoxy resin is selected from polyepoxides having at least two

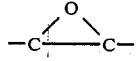

groups.

7. The epoxy resin composition of claim 5 wherein said

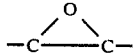

groups are terminal groups.

* * * * *